Figure 2:
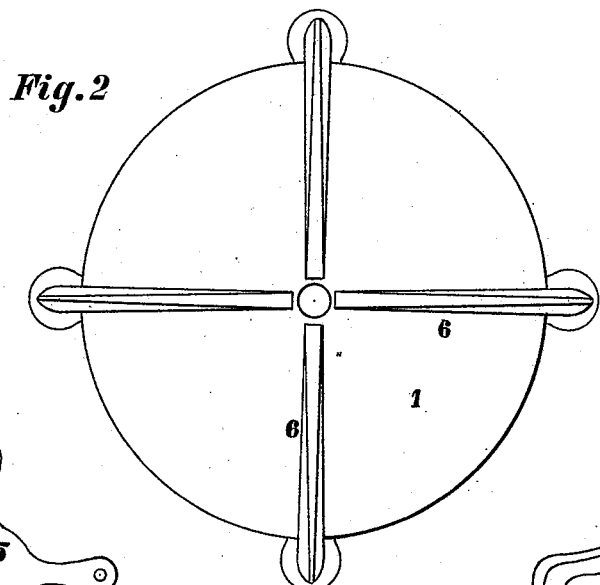

(No Model.) 2 Sheets—Sheet 1.

R. S. PEABODY.
CLAMPING DEVICE FOR MACHINE TOOLS.

No. 528,557. Patented Nov. 6, 1894.

WITNESSES:
W. Hermann Apgar.
K. M. Gilligan.

INVENTOR
Robert Singleton Peabody
BY Augustus B. Stoughton
ATTORNEY (No Model.) 2 Sheets—Sheet 2.

R. S. PEABODY.
CLAMPING DEVICE FOR MACHINE TOOLS.

No. 528,557. Patented Nov. 6, 1894.

UNITED STATES PATENT OFFICE.

ROBERT SINGLETON PEABODY, OF PHILADELPHIA, PENNSYLVANIA.

CLAMPING DEVICE FOR MACHINE-TOOLS.

SPECIFICATION forming part of Letters Patent No. 528,557, dated November 6, 1894.

Application filed May 12, 1894. Serial No. 511,014. (No model.)

*To all whom it may concern:*

Be it known that I, ROBERT SINGLETON PEABODY, a citizen of the United States, residing at the city of Philadelphia, in the county of Philadelphia and State of Pennsylvania, have invented certain new and useful Improvements in Clamping Devices for Machine-Tools, of which the following is a specification.

My invention relates to devices for clamping work to the tables or other analogous parts of machine tools, such as drill-presses, milling machines, or lathes, and it is applicable in whole or in part to other types of machines.

The principal objects of my present invention, are, first, to provide a simple, efficient, compact and durable clamp which may be readily, rapidly and easily adjusted and manipulated for firmly holding and releasing work, and second, to provide a convenient and accurate appliance for permitting holes or apertures of different sizes to be bored in work by means of a lathe having its tail stock adapted to be swung transversely thereof and for centering long rods and the like in such manner that they run true and without torsion or twisting.

In my invention, use is made of a spider frame or yoke located in rear of the plate or table and provided with fingers extending in front of the same, and means for shifting the yoke or frame to cause the fingers to operate as clamps in respect to the table; and use is also made of a movable tailstock adapted to be swung or adjusted transversely of the lathe in connection with a table applied to such tailstock and provided with apertures of various sizes any one of which may, by the rotation of the table and proper turning or transverse adjustment of the tailstock, be brought into alignment with the center of the headstock or of a drill or chuck applied thereto, so that work may be clamped to the plate for example, by the above mentioned fingers, and penetrated by any number of drills of different sizes each of which after passing through the work may enter an aperture of corresponding size previously brought into alignment with it in the manner above described, or long rods may be accurately and readily centered in the lathe by passing them through an aperture of corresponding size in the table which has previously been shifted into alignment with the center of the head-stock and by then clamping them in a chuck carried by the latter, as is hereinafter more fully explained.

The nature, characteristic features and scope of my invention will be more fully understood from the following description taken in connection with the accompanying drawings forming part hereof, and in which—

Figure 4:
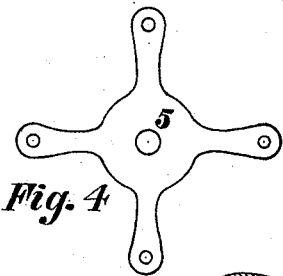
Figure 3:
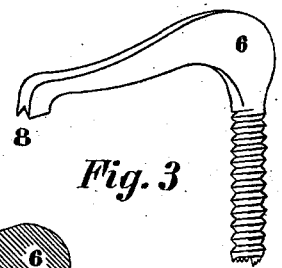
Figure 1:
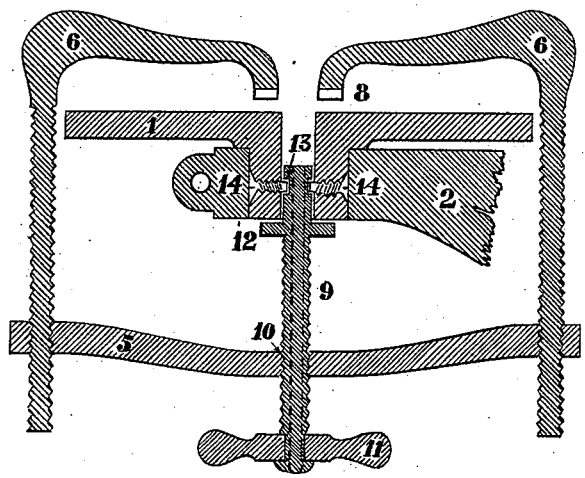
Figure 5:
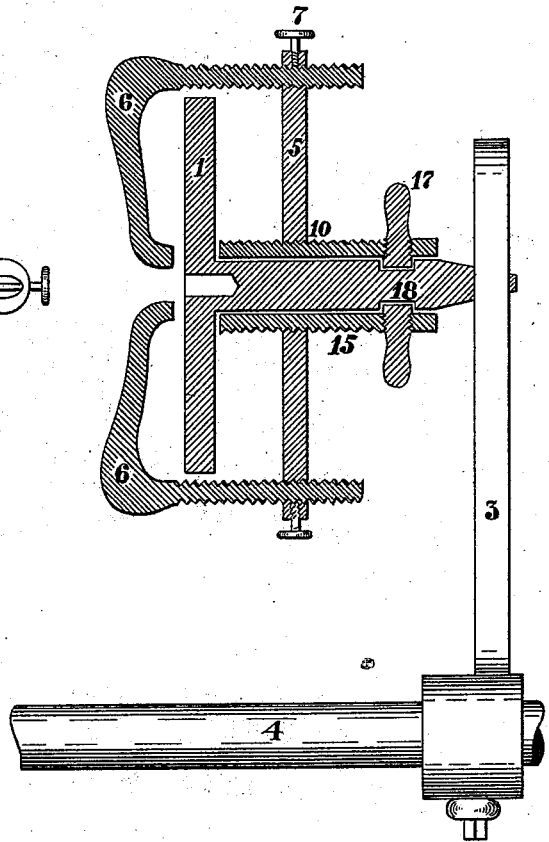

Figure 1, is a sectional view illustrating my invention in application to the plate or table of a well-known type of drill-press. Fig. 2, is a top or plan view of the plate or table showing the fingers which operate as clamps. Fig. 3, is a perspective view of one of the fingers showing its grooved working extremity. Fig. 4, is a detached view of the yoke or spider-frame, drawn upon a reduced scale. Fig. 5, is a sectional view illustrating my invention in application to a plate or table provided with a number of apertures of different sizes and carried by a lathe tailstock that is adapted to be adjusted or swung transversely of the lathe, and Fig. 6, is a face view of the perforated table and adjustable tailstock shown in Fig. 5.

Referring now to the drawings, and more particularly to Figs. 1 to 4, inclusive, 1, is the plate or table of an ordinary type of drill-press, which is carried by a bracket 2, and adapted to support the work as it is operated upon by a drill or other tool not shown.

Figure 6:
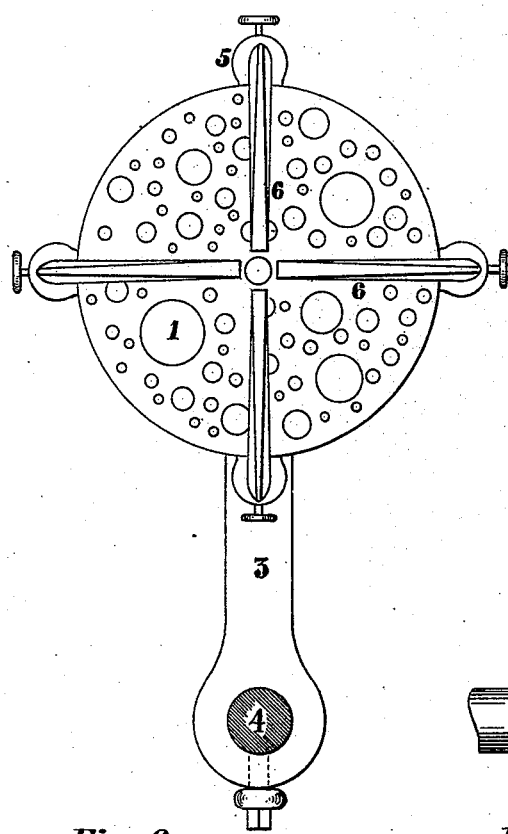

In Figs. 5 and 6, the table 1, is provided with a number of perforations of different sizes adapted for the reception of rods or the points of drills or other tools of corresponding sizes, mounted in the headstock of a lathe. This table is carried by the tailstock 3, of the lathe in such manner that it may be manually rotated and secured in any required position. The tailstock 3, is adjustable transversely of the lathe. In the present instance, this result is accomplished by providing it with an opening encircling the round bed plate 4, and with a set screw for clamping it thereon.

From the above described construction, it follows that any of the apertures in the perforated plate or table, may be brought into alignment with the center of the headstock or of a chuck or drill mounted therein, by the simple operation of rotating the plate or table, and turning the tailstock about the bed 4, until the required aperture occupies the desired position whereupon the parts are secured to place.

5, is a spider-frame or yoke located in rear of the plate or table 1, and provided with fingers 6, extending in front of the same. In the present instance, the arms of the yoke or spider-frame are tapped and the shanks of the fingers are threaded and inserted into the tapped arms, so that the fingers may be readily adjusted to clamp work of uneven thickness and may be turned away from the table so as to facilitate the application and removal of the work.

As illustrated in Fig. 5, the fingers tend, by reason of their weight to turn downward and if this tendency were not restrained they might occupy positions that would cause them to interfere with or be in the way of the operator. However, I have provided set screws 7, which may be employed for clamping the fingers in respect to the arms of the yoke whereby these possible disadvantages or annoyances are avoided.

It may be remarked, that while I have illustrated four fingers in the drawings, I do not limit myself to that number or to the employment of grooves 8, in the ends of the fingers, although the latter are exceedingly useful in practice for holding such articles, as small arbors, in order to permit of their being drilled transversely.

Obviously various types of mechanism may be employed for shifting the yoke 5, in respect to the table in order to cause the fingers 6, to operate as clamps. However, in the accompanying drawings, I have illustrated a type of such mechanism that has been found practically efficient and convenient, namely, a revoluble and endwise immovable member adapted to be operated manually and connected with the rear of the plate or table and provided with a screw-thread engaging with a correspondingly threaded portion of the yoke or frame 5. In Fig. 1, this revoluble member comprises a threaded spindle 9, engaging a tapped orifice 10, in the yoke and provided at one end with a hand-wheel 11. The other end of the spindle 9, is provided with a collar 12, seated upon the projecting portion of the plate or table and provided with a groove 13, into which the points of screws 14, take in such manner that the spindle 9, is held against end play and is permitted freedom of rotation. It may be remarked that the spindle 9, may be centrally perforated or made tubular, as indicated by dotted lines in order to permit of the escape of small particles of metal that are detached from the work by the ordinary operation of the drill or other tool. In Figs. 5 and 6, the revoluble member comprises an externally threaded hand-nut 15, engaging the threaded orifice 10, of the yoke or spindle 5. This revoluble member 15, is provided with lugs 17, that take into a groove 18, in the projecting portion of the plate or table 1.

The mode of operation of the hereinabove described device is as follows: The yoke or frame 5, is shifted toward the plate or table 1, by means of the revoluble member 9, Fig. 1, or 15, Fig. 5, and the work is then applied to the face of the table and is clamped thereto by the simple operation of turning the revoluble member manually in a reverse direction whereby one or all of the fingers 6, are caused to clamp the same firmly in respect to the table. If the work should be of uneven thickness, one or more of the fingers may be accommodated to such increased or diminished thickness by the simple operation of screwing the shank of such finger into or out of the arm of the yoke or frame as required. If the work should be of circular cross-section, it may be inserted into the grooves 8, of oppositely disposed fingers, which, when clamped down, hold it firmly to place in such manner that it may be readily and accurately drilled transversely. Moreover the fingers may be turned in such manner that they may be caused to grasp the work at any required point or points, and when the fingers are slightly loosened, the work may be easily shifted upon the table in order to permit of its accurate adjustment in respect to the drill or other tool.

Referring to Figs. 5 and 6, a drill adapted to produce an opening of any required size may be mounted in the headstock of the lathe, and the perforated table may then be turned and the tailstock adjusted by swinging it around the bed-plate 4, as a center, until an aperture in the table corresponding in size with the drill is brought into alignment therewith. The work may now be clamped to place upon the table by means of one or more of the fingers 6, and perforated by the ordinary operation of the drill. Additional apertures of any required sizes or diameters may be formed in the work by inserting drills adapted to produce apertures of such diameter or size in the headstock, adjusting the table in the manner above described in order to bring one of its apertures that corresponds with the drill being used into alignment therewith and then proceeding to drill or perforate the work in the well understood manner. Moreover the perforated table may be advantageously employed for centering long rods. In such case, the rod to be centered is inserted through an opening of corresponding size in the perforated plate, and one of its ends is clamped in a chuck applied to the headstock. The perforated plate is then adjusted by turning it and by swinging the tailstock until the rod runs true, or in other words, until the aperture through which the rod passes is in alignment with the center of the chuck. Under these circumstances, the rod is hugged and supported by the aperture through which it passes and consequently rotates without torsion, twisting or springing movements and may be accurately turned or otherwise operated upon.

It will be obvious to those skilled in the art to which my invention relates that modifications may be made in details of arrangement without departing from the spirit thereof. Hence, I do not limit myself to the precise construction hereinabove set forth and illustrated in the accompanying drawings, but,

Having thus described the nature and objects of my present invention, what I claim as new, and desire to secure by Letters Patent, is—

1. In combination a plate or table, a spider-frame or yoke located in rear of the plate or table, rigid fingers firmly attached to the arms of said yoke or frame and extending around in front and opposite to the face of the table, and means for shifting the yoke or frame to cause the ends of the fingers to move toward and away from the face of the table or plate, substantially as described.

2. In combination a plate or table, a spider-frame or yoke located in rear of the plate or table, rigid fingers having one of their respective extremities screwed into the arms of the yoke or frame and extending around the edge and opposite the face of said plate or table, and means for shifting the yoke or frame to cause the free ends of the fingers to approach and recede perpendicularly to and from the face of the table or plate, substantially as described.

3. In combination a flat plate or table, a spider-frame or yoke located in rear of the plate or table, L-shaped rigid fingers having one of their arms firmly attached to the frame or yoke and having the ends of their other arms grooved and disposed in front of and parallel with the face of the plate or table, and means interposed between the rear of the table and yoke or frame and adapted to shift the latter to cause the curved ends of the fingers to approach and recede perpendicularly to and from the face of the plate or table, substantially as described.

4. In combination a lathe provided with a round bed-plate, a tailstock arm provided with an opening encircling said bed-plate and with a set-screw for clamping it thereto, and a table provided with apertures of various sizes and revolubly applied to the tailstock arm, substantially as described.

5. In combination, a lathe provided with a transversely adjustable tailstock, a table provided with apertures of various sizes and revolubly applied to said tailstock, a yoke provided with clamping fingers, and means interposed between the table and yoke and adapted to shift the latter in respect to the former, substantially as described.

In testimony whereof I have hereunto signed my name.
    ROBERT SINGLETON PEABODY.

In presence of—
 ANDREW B. CAMPBELL,
 A. B. STOUGHTON.